United States Patent Office 3,416,900
Patented Dec. 17, 1968

3,416,900
FUELS CONTAINING NITROGEN-PHOSPHORUS ANTI-ICING COMPOSITIONS
Casper J. Dorer, Jr., Cleveland, Ohio, assignor to The Lubrizol Corporation, Wickliffe, Ohio, a corporation of Ohio
No Drawing. Original application Aug. 3, 1962, Ser. No. 214,491. Divided and this application Dec. 31, 1963, Ser. No. 334,919
9 Claims. (Cl. 44—63)

The present application is a division of application Ser. No. 214,491, filed Aug. 3, 1962 and now abandoned.

The present invention relates to a process for preparing nitrogen- and phosphorus-containing compositions. In a more particular sense, it relates to certain nitrogen- and phosphorus-containing compositions derived from imidazolines and oxazolines.

The hereindescribed novel nitrogen- and phosphorus-containing compositions are useful in the preparation of a variety of products such as pesticides, fungicides, wetting agents, and improving agents for use in organic materials such as plastics, asphalt, lubricants, and liquid hydrocarbon fuels such as fuel oils and gasoline. They are particularly useful as improving agents for "leaded" gasoline (i.e., gasoline containing a polyalkyl lead anti-detonant and halohydrocarbon scavengers) in that they reduce or prevent undesirable combustion phenomena such as preignition, "wild ping," etc., which lessen the efficiency of an internal combustion engine. They also impart anti-icing properties to a gasoline.

It is, therefore, an object of the present invention to provide a process for preparing new and useful nitrogen- and phosphorus-containing compositions.

Another object is to provide novel nitrogen- and phosphorus-containing compositions.

Still another object is to provide improved liquid hydrocarbon fuels for internal combustion engines.

These and other objects are achieved by means of a process which comprises the reaction of (A) a heterocycle selected from the group consisting of imidazolines and oxazolines with (B) a phosphite diester.

Reagent A

This reagent is an imidazoline or oxazoline which conforms for the most part to the formula

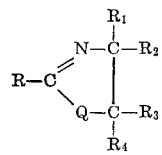

in which R is a substantially hydrocarbon radical containing at least one carbon atom and preferably from about 7 to about 19 carbon atoms; $R_1$, $R_2$, $R_3$, and $R_4$ are substitutents such as hydrogen, alkyl, cycloalkyl, aryl, aralkyl, hydroxyalkyl, haloalkyl, aminoalkyl, H(—O—alkylene—)$_x$,

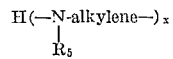

etc., wherein x is an integer from 1 to about 10, alkylene is a methylene, ethylene, propylene, butylene, etc. radical, and $R_5$ is as indicated for $R_1$–$R_4$ inclusive; and Q is

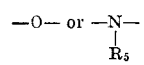

Such imidazolines and oxazolines are readily available from the known condensation of an aliphatic or cycloaliphatic carboxylic acid containing from 2 to about 20 or more carbon atoms with, respectively, an alkylene amine and an alkanolamine, as shown in Equations I and II below.

I. Imidazoline formation

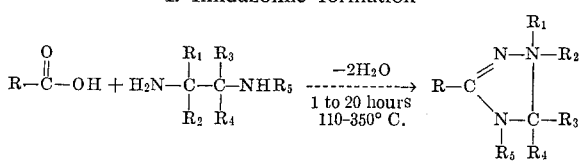

II. Oxazoline formation

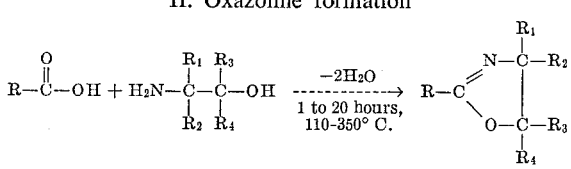

The aliphatic or cycloaliphatic carboxylic acid may be saturated or unsaturated and may contain substitutents such as chloro, fluoro, bromo, ether, sulfide, keto, hydroxyl, etc., as well as aromatic substitutents such as phenyl, tolyl, xylyl, chlorophenyl, hydroxyphenyl, naphthyl, methylnaphthyl, etc. Examples of acids useful for the preparation of imidazolines adapted for the purposes of the present invention are acetic, propionic, butyric, valeric, caproic, caprylic, myristic, palmitic, oleic, linoleic, linolenic, ricinoleic, behenolic, stearolic, stearoxylic, phenylstearic, xylylstearic, chlorostearic, hydroxyphenyl stearic, naphthenic, arachidic, tricosanoic, and triacontanoic acids. Mixtures of any of the foregoing acids are likewise useful. In most instances, it is preferred to use a carboxylic acid which contains from about 8 to about 20 carbon atoms.

The term "alkylene amine" is used herein in a generic sense to represent polyamines conforming for the most part to the general formula

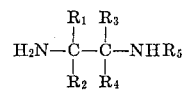

wherein $R_1$–$R_5$, inclusive, are as previously defined. Examples of useful alkylene amines include amines such as ethylene diamine, diethylene triamine, triethylene tetramine, tetraethylene pentamine, pentaethylene hexamine, N-(3-aminopropyl)ethylene diamine, N-(4-aminobutyl) ethylene diamine, and a commercial mixture of ethylene amines known as "Polyamine H," the analysis of which corresponds to tetraethylene pentamine. Mixtures of any of the foregoing amines are likewise useful.

The term "alkanolamine" is likewise used in a generic sense to represent mono- or poly-amino substituted monohydric or polyhydric alcohols conforming for the most part to the formula

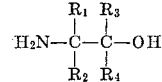

wherein $R_1$–$R_4$, inclusive, are as previously defined. Examples of useful alkanol-amines are ethanolamine, 2-amino-propanol-1, 2-amino-2-methyl-propanediol-1,3, 2-amino-2-(3-aminopropyl)butanediol - 1,3, 2-amino-butanol-1, 2-amino-octanol-, etc. Also useful are mixtures of any of these alkanolamines.

When $R_1$, $R_2$, $R_3$, $R_4$, and $R_5$ are hydrogen atoms, the resulting products are mono-substituted imidazolines and oxazolines such as 2-heptadecenyl imidazoline and 2-heptadecenyl oxazoline. When at least one of $R_1$, $R_2$, $R_3$, $R_4$, and $R_5$ is a substitutent other than hydrogen such as enumerated hereinabove, the resulting products are polysubstituted imidazolines and oxazolines such as 2-hepta-decenyl - 4 - (beta - aminoethyl)imidazoline and 2-heptadecenyl-4-(beta-hydroxyethyl)oxazoline. The nomenclature used herein to describe imidazolines and oxazolines conforms to that set forth on pages 16 and 17 of "The Ring Index" by Patterson, Capell, and Walker; second edition (1960), published by the American Chemical Society.

For the purposes of the present invention it is preferred to use imidazolines and oxazolines which contain from about 10 to about 30 carbon atoms in the molecule. The use of such imidazolines and oxazolines as starting materials results in products which possess the desired degree of solubility in organic materials such as plastics, lubricating oils, and liquid hydrocarbon fuels. It is not necessary that the imidazoline or oxazoline reagent be a chemically pure material. It is convenient and sometimes preferable from a commercial standpoint to use the crude imidazolines and oxazolines which are obtained by the exhaustive dehydration, respectively, of fatty acid-alkylene amine mixtures and fatty acid-alkanolamine mixtures. A number of such products are available commercially under the trade designations "Alkaterge-C" (crude 2-heptadecenyl-4-methyl - 4 - methyloloxazoline) and "Nalcomines" G–11 through G–14 (crude hydroxyethyl - substituted imidazolines derived from fatty materials such as tallow and coconut oil). In some instances it is desirable to use a mixed imidazoline or mixed oxazoline derived from a mixture of aliphatic and/or cycloaliphatic carboxylic acids.

Other examples of imidazolines and oxazolines useful as reagent A in the hereindescribed process include 2-naphthenyl imidazoline, 1-(beta-aminopropyl)-2-hexacosyl imidazoline, 1-(beta-hydroxyethyl)-2-heptadecenyl imidazoline, 1-(beta-aminoethyl)-2-heptadecenyl imidazoline, 1-(N-beta-aminoethyl-aminoethyl)-2 - pentadecenyl imidazoline, 1-(beta-hydroxy-ethoxyethyl)-2 - tridecyl imidazoline, 1-aminoethyl-2-heptyl imidazoline, 1-aminoethyl-2-propyl imidazoline, 2-heptadecenyl-4,4-dimethylol oxazoline, 2-hexyl-4,5 - di - (beta-hydroxyethyl)oxazoline, 2-eicosyl oxazoline, 2-heptacosyl oxazoline, 2-naphthenyl oxazoline, etc.

Reagent B

This reagent is a phosphite diester, i.e., a compound of the formula $(R'O)_2POH$ where R' is an organic radical. Generally R' will be an unsubstituted alkyl, alkaryl, aralkyl, aryl, or cycloalkyl radical such as, e.g., methyl, ethyl, propyl, butyl, amyl, hexyl, octyl, decyl, cetyl, octadecyl, eicosyl, tolyl, ethylphenyl, amylphenyl, methylnaphthyl, benzyl, phenethyl, phenyl, naphthyl, anthracyl, phenanthryl, cyclopentyl, cyclohexyl, methylcyclohexyl, etc. In some instances, however, R' may contain chloro, fluoro, nitro, nitroso, sulfide, keto, ether, or ester substituents. Examples of such substituted radicals include beta-fluoroethyl, 2-nitropropyl, 2-ethoxyethyl, 2-thioethoxypropyl, 3-ketobutyl, carboethoxyethyl, para-chlorophenyl, alpha-nitronaphthyl, etc. For the purposes of this invention, R' is generally an aliphatic radical and preferably a lower alkyl radical containing from 1 to about 6 carbon atoms such as methyl, ethyl, n-propyl, isopropyl, n-butyl, isobutyl, n-hexyl, isoamyl, n-amyl, neopentyl, 4-methyl-2-pentyl, etc.

Phosphite diesters can be prepared by any of several well-known processes, the most convenient and widely-known of which involve the reaction of phosphorus trichloride with an alcohol or a phenol. Specific examples of phosphite diesters useful as reagent B herein include dimethyl phosphite, diethyl phosphite, di-n-propyl phosphite, di-isopropyl phosphite, di-n-butyl phoshite, di-isobutyl phosphite, di-n-amyl phosphite, di-(4-methyl-2-pentyl)phosphite, di-neopentyl phosphite, dioctyl phosphite, dibenzyl phosphite, diphenyl phosphite, ditolyl phosphite, di-cyclohexyl phosphite, di - (4 - methylcyclohexyl)phosphite, methyl ethyl phosphite, ethyl propyl phosphite, butyl hexyl phosphite, phenyl octadecyl phosphite, etc. In lieu of a single phosphite, it is sometimes desirable to use mixtures of two or more different phosphite diesters as reagent B in the hereindescribed process. A particular preference is expressed, however, for dimethyl phosphite.

The relative proportions of reagents A and B and the reaction conditions employed in preparing compositions of this invention are not particularly critical. There is some evidence that the reaction involves about equimolar amounts of reagents A and B. This is not to say, however, that lesser or greater amounts of either reagent cannot be employed. It has been found, for example, that compositions useful for the purposes of this invention can be prepared using as little as 0.1 mole or as much as 5 or more moles of reagent B, the phosphite diester, per mole of reagent A. Ordinarily it is preferred, however, to use about equimolar amounts of reagents A and B in the interest of convenience and economy of starting materials.

The reaction between reagents A and B is slightly exothermic and can be carried out at any temperature within the range from about room temperature or below to a temperature just beneath the decomposition temperature of the reaction mass. In order to insure complete reaction, it is generally preferred to heat the reaction mass for 0.5 to 8 hours at 70–150° C. If an excess of one reagent, for example, the phosphite diester, is employed, it may be desirable in some instances to strip such excess from the reaction mass. In other instances, however, the excess of either reagent may be allowed to remain in the final product.

The structures of the compositions of this invention are not known. Infra-red analyses of the products prepared by the reaction of an imidazoline or an oxazoline, respectively, with a phosphite diester show absorption peaks which are not present in any of the starting materials used. The nature of the chemical bonds indicated by these new absorption peaks has not yet been ascertained.

The following examples set forth specific modes of preparing compositions of the present invention. They are intended only for the purpose of illustration and are not to be construed as limiting the scope of the invention, except as the latter is defined by the appended claims.

EXAMPLE 1

1,883 grams (12.92 moles) of iso-octanoic acid, 928 grams of a 3:1 weight mixture of triethylene tetramine and diethylene triamine, and 200 grams of toluene solvent are boiled at 135–220° C. over a period of 18.5 hours while water and toluene solvent are removed as the temperature ascends. 393 grams of water (84.6% of theory for imidazoline formation) is removed during the distillation process. The residue is then heated to 160° C./5 mm. Hg to remove the last traces of water and toluene solvent. Filtration of the residue yields 2,403 grams of a crude imidazoline.

213 grams (1 mole) of this crude imidazoline and 132 grams (1.2 moles) of dimethyl phosphite are mixed at 100° C. The exothermic reaction which ensues carries the temperature to about 132° C. Thereafter, the whole is maintained at 100–110° C. for 3 hours and then stripped at 85° C./2 mm. Hg to remove the excess dimethyl phosphite, which amounts to 22 grams (0.2 mole). The residue remaining in the flask, amounting to 334 grams, is a composition of the invention. It shows the following analysis.

|  | Percent |
|---|---|
| Phosphorus | 9.32 |
| Nitrogen | 8.82 |

EXAMPLE 2

142 grams (0.5 mole) of oleic acid and 120 grams (2.0 moles) of ethylene diamine are mixed over a period of 0.75 hour at 25–47° C. The excess ethylene diamine is then removed by distillation of the mass at 31–40° C./17 mm. Hg. Thereupon 50 grams of toluene solvent is added to the residue and the whole is exhaustively dehydrated by heating it from 135 to 167° C. over a period of 5 hours. The theoretical amount of water (18 grams) for imidazoline formation is recovered in the distillate. The residue is then distilled, yielding a fraction boiling at 194–213° C./1 mm. Hg, which is substantially pure 2-heptadecenyl imidazoline.

44 grams (0.144 mole) of the above imidazoline and 20 grams (0.182 mole) of dimethyl phosphite are introduced into a reaction vessel and stirred for 6 hours at 120–125° C. Thereafter, the whole is heated at 62–64° C. vapor temperature/15 mm. Hg to remove the excess of dimethyl phosphite employed. The residue in the flask, and approximately equimolar complex of 2-heptadecenyl imidazoline and dimethyl phosphite, amounts to 61 grams. It shows the following analysis.

| | Percent |
|---|---|
| Phosphorus | 7.97 |
| Nitrogen | 5.34 |

EXAMPLE 3

3,465 grams (11 moles) of naphthenic acid, 3,102 grams (11 moles) of oleic acid, and 1,580 grams of a 3:1 weight mixture of triethylene tetramine and diethylene triamine are diluted with 800 grams of toluene solvent. The whole is boiled at 135–215° C. over a 15 hour period while toluene solvent and water of reaction are removed. The amount of water collected amounts to 645 grams or 81.4% of the theoretical amount for imidazoline formation. The residue is then stripped at 165° C./4 mm. Hg to remove traces of water and solvent. Upon filtration there is obtained 7,513 grams of a crude mixed imidazoline.

556 grams (1.48 average moles) of the above imidazoline and 162.5 grams (1.48 moles) of dimethyl phosphite are mixed in a reaction vessel. A slight heat of reaction is noted. The whole is heated for 3 hours at 95–117° C. and then stripped at 130° C./2.5 mm. Hg to remove any unreacted dimethyl phosphite. About 16 grams of dimethyl phosphite is recovered. The residue, a product of the present invention, shows the following analysis.

| | Percent |
|---|---|
| Phosphorus | 5.39 |
| Nitrogen | 5.99 |

EXAMPLE 4

186 grams (0.52 mole) of the commercial oxazoline known by the trade designation "Alkaterge C" and 66 grams (0.6 mole) of dimethyl phosphite are heated for three hours at 95–100° C. The whole is then heated to 85° C. liquid temperature/3 mm. Hg; no distillate is recovered. The residue, a product of this invention, shows the following analysis.

| | Percent |
|---|---|
| Phosphorus | 5.16 |
| Nitrogen | 3.22 |

EXAMPLE 5

A product is made in the same manner set forth in Example 1, except that 166 grams (1.2 moles) of diethyl phosphite is used in lieu of the dimethyl phosphite specified.

EXAMPLE 6

A product is made in the same manner set forth in Example 2, except that 45.5 grams (0.182 mole) of di-(4-methyl-2-pentyl)phosphite is used in lieu of the dimethyl phosphite specified.

EXAMPLE 7

A product is made in the same manner set forth in Example 4, except that 116 grams (0.6 mole) of di-n-butyl phosphite is used in lieu of the dimethyl phosphite specified.

As indicated earlier, the compositions of this invention are useful as pesticides, fungicides, wetting agents, and miproving agents for a wide variety of organic materials. When used as improving agents for asphalt or other bituminous materials, the compositions of this invention will generally be present in an amount ranging from about 0.1 to about 5 weight-percent, preferably 0.25–2 percent. For the improvement of lubricating oils, especially mineral lubricating oils, generally from about 0.05 to about 10 percent and preferably 0.1–5 percent of the compositions of this invention will be employed. A lubricant compounded, for example, from SAE 20 mid-continent solvent-refined mineral oil plus 0.25 percent of the product of Example 4 serves as an oxidation-resistant crankcase oil. The compositions of this invention are likewise useful as improving agents for the lubricating oil-fuel mixtures employed in the operation of two-cycle engines. In a liquid hydrocarbon fuel such as leaded gasoline, as little as 0.001–0.15 percent of a composition of this invention is effective. For example, 64 mg. of phosphorus as the product of Example 3 added to a gasoline containing 3.5 ml./gallon of a commercial tetraethyl lead fluid is effective to reduce the incidence of carburetor icing and pre-ignition when such fuel is used in a high-compression gasoline engine. The amount of the product of Example 3 expressed in weight-percent of the gasoline is approximately 0.045 percent.

It is believed that the bucking and stalling of carbureted gasoline engines, particularly during cool, humid weather, is caused by ice which forms near the circumference of the throttle plate. This ice restricts the flow of the air-gasoline mixture into he combusion chambers and causes an idling engine o stall. The utility of the compositions of this invention as anti-icing agents for gasoline is shown by means of a laboratory carburetor icing test.

The apparatus for this test consists of a 6-gallon cylindrical tower packed with crushed ice, a rudimentary carburetor with attached throttle body and throttle plate, a 30-inch mercury manometer, and 2 vacuum pumps. The carburetor is fashioned from a brass venturi tube into which gasoline is introduced by means of a No. 20 hypodermic needle. The attached throttle body consists of a 1.5-inch outside diameter lucite tube fitted with a circular brass throttle plate. A hollow cooling jacket surrounds the lucite tube and the mercury manometer is connected to a tap located at the exit of the lucite tube. During the operation of the apparatus, cold air is drawn from the iced tower through the cooling jacket by means of one of the vacuum pumps, thus cooling the lucite tube to 9–13° C. The other vacuum pump, which is attached to the exit of the lucite tube, draws cold, humid air from the iced tower, mixes it with fuel in the carburetor, and causes the resulting air-fuel mixture to pass through the cooled lucite tube fitted with the throttle plate. When ice forms on the throttle plate, this is reflected in a sharp increase in the vacuum registered on the manometer. The time required for this increase to occur is a measure of the anti-icing properties of the gasoline; that is, the longer the time, the better the anti-icing characteristics of the gasoline.

The improved anti-icing characteristics secured by incorporating a composition of this invention in a gasoline are clearly shown in the following table.

Table.—Laboratory anti-icing test

| Improving agent in the test gasoline (isooctane) | Time in seconds for a sharp increase in vacuum to occur |
|---|---|
| None (control) | 17 |
| 0.005% by weight of the product of Example 3 | 47 |
| 0.008% by weight of the product of Example 4 | 35 |

What is claimed is:

1. A fuel composition which comprises a major amount of liquid hydrocarbon fuel and from about 0.001% to 0.15% of an anti-icing composition prepared by reacting, for 0.5 to 8 hours at 70–150° C., (A) a heterocyclic compound of the formula

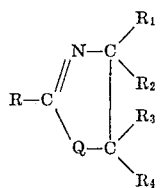

wherein R is an aliphatic or cycloaliphatic hydrocarbon radical containing from 1 to about 19 carbon atoms, $R_1$, $R_2$, $R_3$, and $R_4$ are each hydrogen, alkyl, cycloalkyl, aryl, aralkyl, hydroxyalkyl, haloalkyl, aminoalkyl, H(O-alkylene)$_x$, or

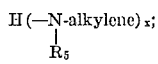

$R_5$ is as indicated for $R_{1-4}$; $x$ is an integer from 1 to about 10; and Q is O or $NR_5$; said heterocyclic compound having about 10–30 carbon atoms; with (B) about 0.1–5.0 moles, per mole of Component A, of a compound of the formula $(RO)_2POH$, wherein R is alkyl, alkaryl, aralkyl, aryl or cycloalkyl.

2. The fuel composition of claim 1 wherein the liquid hydrocarbon fuel is gasoline.

3. The fuel composition of claim 1 wherein the liquid hydrocarbon fuel is a leaded gasoline.

4. The fuel composition of claim 1 wherein the liquid hydrocarbon fuel is fuel oil.

5. The fuel composition of claim 1 wherein Component A is a mixed imidazoline derived from naphthenic acid, oleic acid and triethylene tetramine.

6. The fuel composition of claim 1 wherein Component B is a lower dialkyl phosphite.

7. The fuel composition of claim 1 wherein Component B is dimethyl phosphite.

8. The fuel composition of claim 1 wherein about equimolar proportions of Components A and B are employed.

9. The fuel composition of claim 5 wherein the liquid hydrocarbon fuel is a leaded gasoline and Component B is dimethyl phosphite.

References Cited

UNITED STATES PATENTS

| | | | |
|---|---|---|---|
| 2,442,582 | 6/1948 | Bishop | 260—307.6 |
| 2,828,195 | 3/1958 | Yust et al. | 44—69 |
| 2,841,480 | 7/1958 | Yust et al. | 44—69 |
| 3,023,092 | 2/1962 | Hook et al. | 44—69 |

DANIEL E. WYMAN, *Primary Examiner.*

Y. H. SMITH, *Assistant Examiner.*

U.S. Cl. X.R.

44—69